United States Patent [19]
Tsuchiya et al.

[11] Patent Number: 6,098,704
[45] Date of Patent: Aug. 8, 2000

[54] HEAT EXCHANGER HAVING A DOUBLE PIPE CONSTRUCTION AND METHOD FOR MANUFACTURING THE SAME

[75] Inventors: Shizuo Tsuchiya, Gifu, Japan; Akira Isaji, deceased, late of Nishio, Japan, by Tamiko Isaji, legal representative

[73] Assignee: DENSO Corporation, Kariya, Japan

[21] Appl. No.: 09/092,557

[22] Filed: Jun. 5, 1998

[30] Foreign Application Priority Data

Jun. 6, 1997 [JP] Japan ................................ 9-149414

[51] Int. Cl.⁷ .......................................................... F28D 7/10
[52] U.S. Cl. ............................................................. 165/154
[58] Field of Search .................................... 165/154, 155, 165/916

[56] References Cited

U.S. PATENT DOCUMENTS 4,502,533  3/1985  Nielsen .................................. 165/154
5,641,016  6/1997  Isaji et al. .

FOREIGN PATENT DOCUMENTS 63-306398  12/1988  Japan ..................................... 165/154
3-59395    3/1991   Japan ..................................... 165/154
3-251686   11/1991  Japan ..................................... 165/154
305337     6/1971   U.S.S.R. ............................... 165/154

*Primary Examiner*—Allen Flanigan
*Attorney, Agent, or Firm*—Harness, Dickey & Pierce

[57] ABSTRACT

In a heat exchanger having a coaxial pipe, the coaxial pipe is formed by integrating an inner pipe, an outer pipe and connecting walls together by an extruding or a drawing forming process. A header of a first connecting member is connected to a removed portion formed by removing a part of the outer pipe at an end portion of the coaxial pipe. A second connecting member is welded to the inner pipe at a more longitudinal end side of the inner pipe than the header. Thus, the coaxial pipe can be bent like a coil for downsizing the heat exchanger without reducing the heat-exchanging ability of the heat exchanger, and the total cost of manufacturing the heat exchanger can be reduced.

7 Claims, 4 Drawing Sheets

HEAT EXCHANGER HAVING A DOUBLE PIPE CONSTRUCTION AND METHOD FOR MANUFACTURING THE SAME

CROSS REFERENCE TO RELATED APPLICATION

This application is based on Japanese Patent Application No. Hei. 9-149414 filed on Jun 6, 1997.

BACKGROUND OF THE INVENTION

1. Field of the Invention

The present invention relates to a heat exchanger having a double pipe construction, which is applied to a vehicle air conditioning apparatus.

2. Description of Related Art

A general coaxial pipe for a heat exchanger includes, as shown in FIG. 8, an inner pipe 110, and an outer pipe 120 having plural projections 131. The projections 131 are formed at the inside wall of the outer pipe 120 integrally and press-connected to the outside wall of the inner pipe 110.

The coaxial pipe is manufactured by forming the inner pipe 110 and the outer pipe 120 independently, inserting the inner pipe 110 into the outer pipe 120, and ironing the outer pipe 120 to press-connect the projections 131 to the outside wall of the inner pipe 110.

However, in the conventional method, the forming process to form the inner pipe 110 and the outer pipe 120 independently and the ironing process are needed. Therefore, it is difficult to reduce the total cost for manufacturing the coaxial pipe.

Further, in the conventional manufacturing method in which the projections 131 are press-connected to the outside wall of the inner pipe 110 by ironing the outer pipe 120, when the coaxial pipe is bent for downsizing the heat exchanger, the projections 131 are likely to be separated away from the outside wall of the inner pipe 110 at the bent portions.

When the projections 131 are separated away from the outside wall of the inner pipe 110, heat transmitting ratio between first fluid flowing through the outer pipe 120 and second fluid flowing through the inner pipe 110 decreases, thereby reducing the heat-exchanging ability of the heat exchanger.

SUMMARY OF THE INVENTION

An object of the present invention is to provide a heat exchanger having a double pipe construction in which projections (connecting walls) are less likely to be separated away from the outside wall of an inner pipe at a bent portion, and to reduce a total cost of manufacturing the same.

According to a first aspect of the present invention, a double pipe construction is formed by integrating an inner pipe, an outer pipe and a connecting wall together by an extruding process or a drawing process. A first connecting member communicating a first passage formed between the inner pipe and the outer pipe with a first external pipe is connected to a removed portion formed by removing a part of the outer pipe at an end portion of the double pipe construction.

Thus, because the double pipe construction is formed by integrating the inner and outer pipes and the connecting wall together, when the double pipe construction is bent like a coil, there does not arise that the connecting wall separates from the outside wall surface of the inner pipe. As a result, the double pipe construction can be bent like a coil for downsizing the heat exchanger without reducing the heat-exchanging ability of the heat exchanger.

Further, because processes for forming the inner and outer pipes independently and an ironing process are not needed, the number of forming process steps is reduced to less in comparison with the conventional manufacturing method, thereby reducing the total cost of manufacturing the heat exchanger.

According to a second aspect of the present invention, a connecting surface between a second connecting member and an inner pipe is located at the more longitudinal end side of a double pipe construction than a first connecting member.

Thus, the second connecting member and the inner pipe are easily connected to each other, and as the connecting surface can be visual-inspected directly, the deterioration in connection at the connecting surface is easily found. Thereby, the quality of the heat exchanger is improved.

According to a third aspect of the present invention, a double pipe construction is made of aluminum, and an inner pipe includes an inner fin. A zinc diffusion layer is disposed on the inner fin and the inside wall of the inner pipe.

Thus, as the inner fin tends to be corroded (sacrifice corroded) before the inner pipe partitioning a first passage from a second passage formed inside the inner pipe is corroded, the inner pipe is less likely to be corroded, thereby extending the life of the heat exchanger.

BRIEF DESCRIPTION OF THE DRAWINGS

Additional objects and advantages of the present invention will be more readily apparent from the following detailed description of preferred embodiments thereof when taken together with the accompanying drawings, in which.

DETAILED DESCRIPTION OF PREFERRED EMBODIMENTS (First Embodiment)

Figure 1:
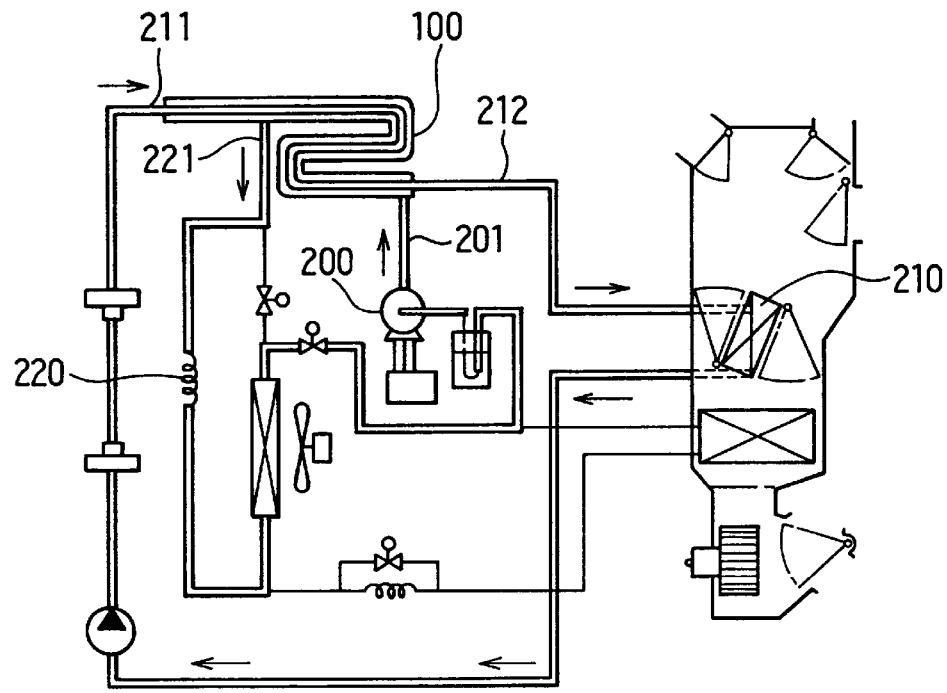
FIG. 1 is a schematic view of an electric vehicle air conditioning apparatus.

A heat exchanger 100 is applied to an electric vehicle air conditioning apparatus as shown in FIG. 1. In the heat exchanger 100, a refrigerant discharged from a compressor 200 heat exchanges with a fluid, for example water mixed with antifreeze liquid such as ethylene glycol, to flow through a heater core 210 when the air conditioning apparatus performs a heating operation.

Figure 2:
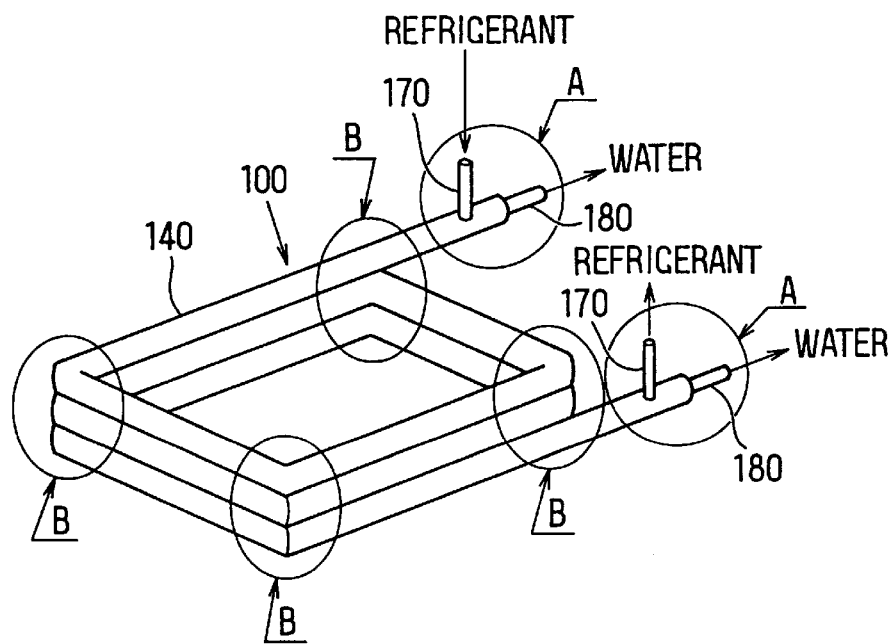
FIG. 2 is a perspective view showing a heat-exchanging portion of a heat exchanger according to the present invention.
Figure 3:
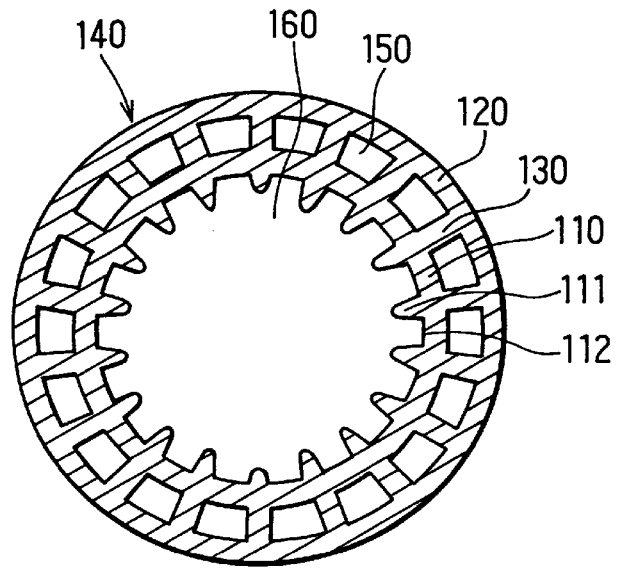
FIG. 3 is a cross sectional view of a coaxial pipe according to the present invention.

As shown in FIGS. 2, 3, a heat-exchanging portion of the heat exchanger 100 where the refrigerant (first fluid) heat exchanges with the water (second fluid) has a coaxial pipe 140. The coaxial pipe 140 includes an inner pipe 110, an outer pipe 120, and a plurality of connecting walls 130, which are integrated with each other. Each connecting wall 130 connects the inner pipe 110 and the outer pipe 120, and functions as a fin member which improves a heat transmitting efficiency between the inner pipe 110 and the refrigerant.

Here, the refrigerant flows through a first passage 150 formed between the inner pipe 110 and the outer pipe 120, while the water flows through a second passage 160 formed inside the inner pipe 110.

The coaxial pipe 140 is bent like a coil (FIG. 2) for increasing a heat exchanging ability and downsizing the heat-exchanging portion. First connecting members 170 and second connecting members 180 are connected to both end portions of the coaxial pipe 140. The first connecting members 170 connect first external pipes 201, 221 (FIG. 1), which are connected to the outlet side of the compressor 200 and a capillary (pressure reducing member) 220 respectively, to the first passage 150. The second connecting members 180 are made of aluminum and connect second external pipes 211, 212, which are connected to the heater core 210, to the second passage 160.

Figure 4:
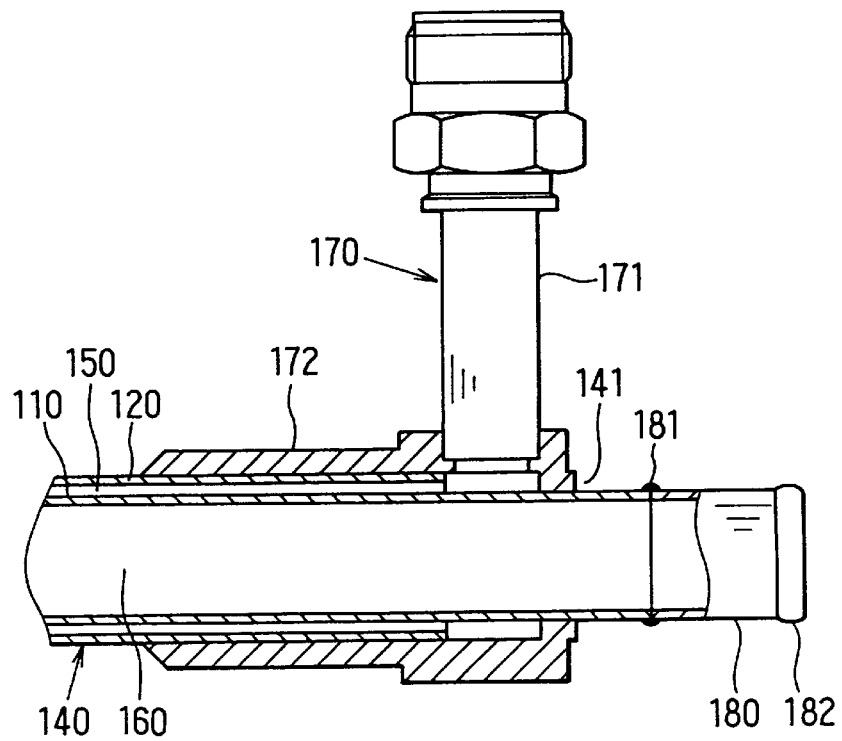
FIG. 4 is an enlarged cross sectional view showing the coaxial pipe according to a first embodiment at the A part in FIG. 2.

The connecting portion A (FIG. 2) between the connecting members 170, 180 and the coaxial pipe 140 is shown in FIG. 4.

Figure 5A:
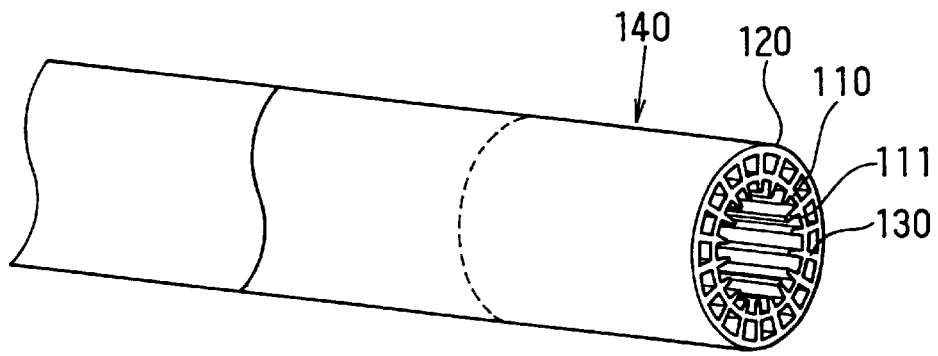
FIG. 5A is a perspective view showing the coaxial pipe before a part of an outer pipe is removed.
Figure 5B:
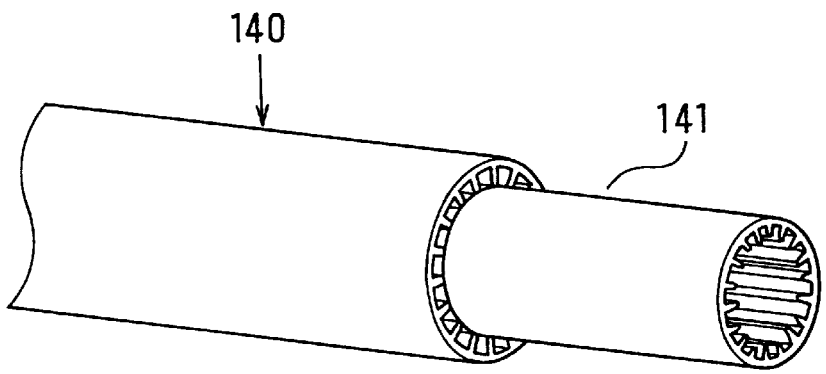
FIG. 5B is a perspective view showing the coaxial pipe after a part of the outer pipe is removed.

Specifically, the first connecting member 170 is constructed by a connecting pipe 171 and a header 172. The connecting pipe 171 is made of aluminum and disposed perpendicularly to the coaxial pipe 140. The header 172 is made of aluminum and communicates the connecting pipe 171 with the first passage 150. The header 172 is welded to the inner and outer pipes 110, 120 while covering a removed portion 141 as shown in FIGS. 5A, 5B. The portion 141 is formed by removing a part of the outer pipe 120 from the coaxial pipe 140 at the longitudinal end portion thereof.

The second connecting member 180 is welded to the longitudinal end of the inner pipe 110. The connecting surface 181 between the second connecting portion 180 and the inner pipe 110 is located at the longitudinal end of the removed portion 141 which is disposed at the end side (right side in FIG. 4) of the coaxial pipe 140 more than the header 172.

As shown in FIGS. 3, 5A, 5B, a plurality of inner fins 111 are formed at the inside wall of the inner pipe 110. The inner fins 110 protrude toward the center axis of the inner pipe 110 and extend in the longitudinal direction of the inner pipe 110. The inner fins 111 improve heat transmitting efficiency between the water and the inner pipe 110.

Figure 6:
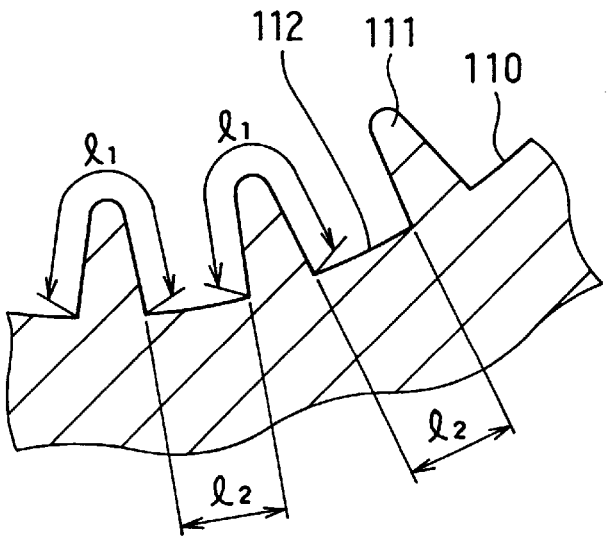
FIG. 6 is an enlarged cross sectional view showing a part of an inner pipe.

As shown in FIG. 6, the length L1 along the outer edge of the inner fin 111 is set to be longer than the width L2 of a valley portion 112 (L1>L2) for making the surface area S1 of the inner fin 111 larger than the surface area S2 of the valley portion 112 (S1>S2). Here, the valley portion 112 is an inside wall surface of the inner pipe 110 except for the surface where the inner fin 111 is formed, and partitions the first passage 150 from the second passage 160.

The heat transmitting ratio of the water mixed with antifreeze liquid such as ethylene glycol is a half of the general water. Therefore, the inner fin 111 is needed to improve the heat exchanging ability of the heat exchanger 100.

A zinc diffusion layer is provided by plating on the inner fin 111 and the inside wall of the inner pipe 110, for improving the anti-corrosion performance of the inner pipe 110. That is, a sacrifice corrosion layer is provided on the inner fin 111 and the inner pipe 110. As the zinc diffusion layer tends to be corroded more than the aluminum, the zinc diffusion layer is corroded before the inner fin 111 and the inner pipe 110 are corroded. As a result, the inner pipe 110 made of aluminum is less likely to be corroded. In the present embodiment, for example, the surface zinc concentration is set to be 0.5%–1.0% and the thickness of the sacrifice corrosion layer (zinc diffusion layer) is set to be about 0.2 mm–0.5 mm.

Next, a method of manufacturing the heat exchanger 100 will be described.

First, the coaxial pipe 140 is formed by extruding or drawing aluminum material (approximately pure aluminum material A1000) to integrally form the inner pipe 110, the outer pipe 120, the connecting walls 130, and the inner fins 111 (coaxial pipe forming process).

Next, a part of the outer pipe 120 is removed by cutting to provide the removed portion 141 mechanically (removing process), and the first connecting member 170 is welded to the outer walls of the inner and outer pipes 110, 120 (first connecting process).

Finally, the second connecting member 180 is welded to the longitudinal end portion of the inner pipe 110 (second connecting process), and the welded parts are inspected (inspecting process). After that, the zinc diffusion layer is disposed on the inner fins 111 and the inside wall of the inner pipe 110 (disposing zinc diffusion layer process).

Here, the header 172 is formed by a cut-forming process or a die-cast forming process, and a flange portion 182 (FIG. 4) of the second connecting member 180 is formed by expanding radially the longitudinal end of the aluminum pipe.

The coaxial pipe 140 is formed by extruding or drawing the aluminum material to integrally form the inner and outer pipes 110, 120, the connecting walls 130, and the inner fins 111. Thus, when the coaxial pipe 140 is bent like a coil, there does not arise that the connecting walls 130 are separated from the outside wall surface of the inner pipe 110. As a result, the coaxial pipe 140 can be bent like a coil for downsizing the heat exchanger 100 without reducing the ability of the heat exchanger.

Further, because the coaxial pipe 140 is formed by integrating the inner and outer pipes 110, 120, the connecting walls 130, and the inner fins 111 together, a process for forming the inner and outer pipes 110, 120 independently and an ironing process are not needed. Thus, the number of forming process steps is reduced in comparison with the conventional manufacturing method, thereby reducing the total cost of manufacturing the heat exchanger 100 (coaxial pipe 140).

In the zinc diffusion layer plating process, the liquid including zinc is fed into the inner pipe 110 and the zinc sticks to the inside wall surface of the inner pipe 110, after that, the heat exchanger 100 is carried into a high temperature drying chamber and is dried. At this time, as the mass transfer ratio within the surface of the inner fin 111 is higher at the tip side of the inner fin 111, the zinc sticking and the zinc diffusing are more performed at the tip side of the inner fin 111.

Accordingly, as the tip side of the inner fin 111 tends to be corroded, the inner fin 111 is corroded (sacrifice corroded) before the inner pipe 110 partitioning the first passage 150 from the second passage 160 is corroded. Thus, the inner pipe 110 is less likely to be corroded, thereby extending the life span of the heat exchanger 100.

Further, as the connecting surface 181 between the second connecting member 180 and the inner pipe 110 is located at the more longitudinal end side of the coaxial pipe 140 than the first connecting member 180, as shown in FIG. 4, the connecting surface 181 can be directly visual-inspected. Thus, the second connecting member 180 and the inner pipe 110 are easily connected to each other, and the deterioration of connection at the connecting surface 181 is easily found. Thereby, the quality of the heat exchanger 100 is improved.

As described above, because the connecting surface 181 is directly visual-inspected, the deterioration of connection is easily repaired even when the deterioration is found. Therefore, the number of coaxial pipe 140 which is wasted for the difficulty of repairing is made small, thereby reducing the total cost of the manufacturing the heat exchanger 100 (coaxial pipe 140).

The coaxial pipe 140 is made of the same metal (aluminum) as the first and second connecting members 170, 180, thus, electric corrosion is reduced at each connecting portion. As a result, the durability of the heat exchanger 100 is improved in comparison with a heat exchanger formed by connecting parts made of different materials.

The coaxial pipe 140 and the connecting members 170, 180 are made of aluminum, thereby lightening the heat exchanger 100 and improving the loading performance thereof on a vehicle.

(Second Embodiment)

Figure 7:
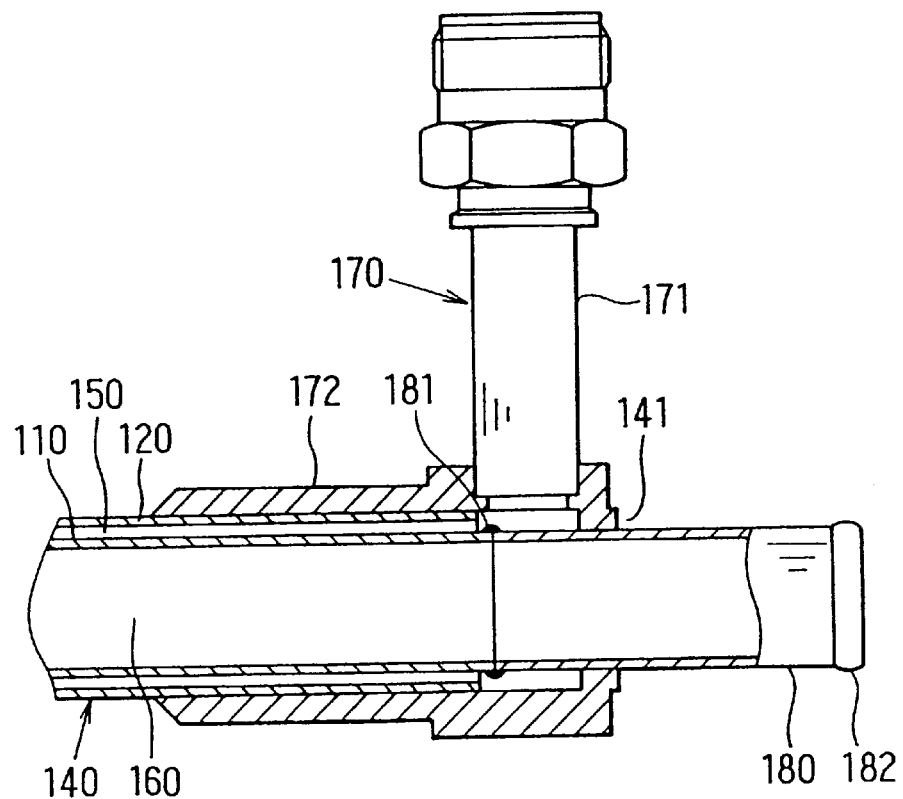
FIG. 7 is an enlarged cross sectional view showing a coaxial pipe according to a second embodiment at the A part in FIG. 2.
Figure 8:
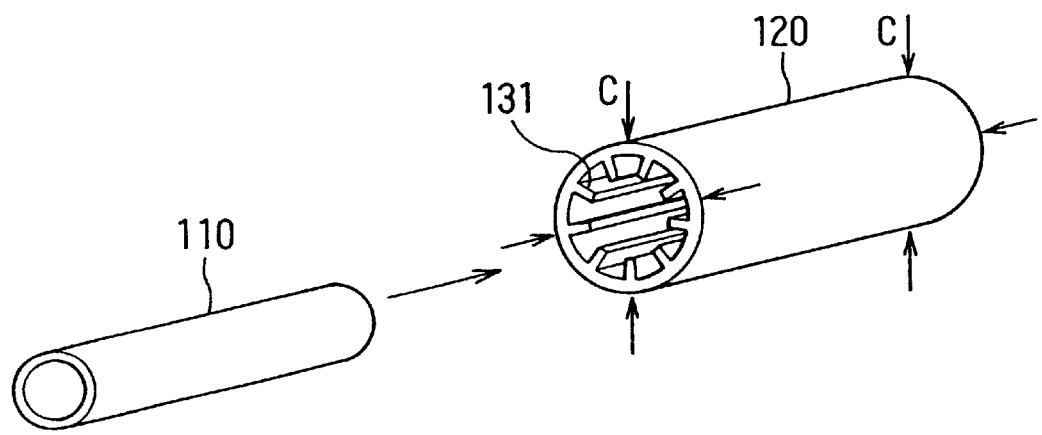
FIG. 8 is a perspective view for explaining a prior art method of manufacturing a coaxial pipe.

According to a second embodiment, as shown in FIG. 7, the connecting surface 181 is located within the area where the first connecting member 170 (header 172) is disposed. In this embodiment, the first connecting process may be carried out after the second connecting process, or these connecting processes may 5 be carried out simultaneously.

Further, an area to be removed in the removing process becomes smaller than that in the first embodiment, thereby reducing the time needed for the removing process.

In the above embodiment, the inner fin 111 is formed at the inside wall of the inner pipe 110. However, when the water unmixed with the antifreeze liquid the heat transmitting ratio of which is large flows through the second passage 160, the inner fin 111 is not needed.

In the above embodiment, the coaxial pipe 140 is bent like a coil for downsizing the heat exchanger 100. Alternatively, the coaxial pipe 140 may be another bent construction having plural bent portions like a cylindrical coil or a corrugated shape.

What is claimed is:

1. A heat exchanger carrying out heat exchange between a first fluid and a second fluid, which is connected to a first external pipe through which the first fluid flows and a second external pipe through which the second fluid flows, comprising:

a double pipe construction in which an inner pipe, an outer pipe and a connecting wall to connect the inner pipe and the outer pipe are unitarily formed by one of an extruding process and a draw forming process, said inner pipe and said outer pipe forming a first passage through which the first fluid flows therebetween, said inner pipe forming a second passage through which the second fluid flows;

a removed portion formed at a longitudinal end of said double pipe construction, said removed portion being formed by removing a part of said outer pipe for a specified distance from said longitudinal end to fully expose said inner pipe for said specific distance;

a first connecting member connected to said exposed inner pipe and said outer pipe, said first connection sealingly connecting said first passage with said first external pipe; and a second connecting member connected to a longitudinal end of said exposed inner pipe, said second connecting member communicating said second passage with said second external pipe.

2. A heat exchanger according to claim 1, wherein said inner pipe and said outer pipe have a common axis and form a coaxial pipe.

3. A heat exchanger according to claim 1, wherein a connecting surface between said second connecting member and said inner pipe is located at a more longitudinal end side of said double pipe construction than said first connecting member.

4. A heat exchanger according to claim 1, wherein said double pipe construction is made of aluminum.

5. A heat exchanger according to claim 4, further comprising:

a plurality of inner fins protruding from an inside wall of said inner pipe toward a center axis thereof; and zinc diffusion layer provided on said inner fins and said inside wall of said inner pipe.

6. A heat exchanger according to claim 1, wherein said inner pipe, said outer pipe and said connecting wall are integrally formed by said extruding process.

7. A heat exchanger according to claim 1, wherein said inner pipe, said outer pipe and said connecting wall are integrally formed by said draw forming process.

* * * * *